United States Patent [19]
Greenberg

[11] Patent Number: 5,805,480
[45] Date of Patent: Sep. 8, 1998

[54] ROTATIONALLY PREDICTIVE ADAPTIVE FILTER

[75] Inventor: Craig B. Greenberg, Sunnyvale, Calif.

[73] Assignee: National Semiconductor Corporation, Santa Clara, Calif.

[21] Appl. No.: 887,521

[22] Filed: Jul. 3, 1997

[51] Int. Cl.$^6$ .................................................. G06F 17/00
[52] U.S. Cl. .............................. 364/724.19; 364/724.2; 375/232
[58] Field of Search ..................... 364/724.04, 724.012, 364/724.013, 724.02, 724.11, 724.16, 724.19, 724.2; 375/229, 230, 232, 233, 234, 235, 236

[56] References Cited

U.S. PATENT DOCUMENTS

| 5,084,902 | 1/1992 | Aotani et al. | 375/350 |
| 5,414,766 | 5/1995 | Cannalire et al. | 379/410 |
| 5,506,871 | 4/1996 | Hwang et al. | 364/724.2 X |
| 5,559,839 | 9/1996 | Doelman | 375/350 |
| 5,590,154 | 12/1996 | Forni et al. | 364/724.2 X |

OTHER PUBLICATIONS

Haykin, S., *Adaptive Filtering Theory*, Third Edition, pp. xiii–xiv; pp. 1–6; pp. 11–15; pp. 18–21; pp. 34–39; pp. 69–73; Chap. 9., "Least–Mean–Square Algorithm," pp. 365–369, Prentice–Hall, Inc., 1996.

Dorf, R. C. & Zhen Wan, "64.2 Equalization," *The Electrical Engineering Handbook*, pp. 1410–1416, CRC Press, Inc., 1993.

Gibson, J. D. & John G. Proakis, "Channel Equalization," Chap. 26, *The Communications Handbook*, pp. 339–363, CRC Press LLC, 1997.

Rappaport, T. S., "Equalization, Diversity, and Channel Coding," Chap. 6, *Wireless Communications—Principles and Practice*, pp. 299–324, Prentice Hall PTR, 1996.

Primary Examiner—Chuong Dinh Ngo
Attorney, Agent, or Firm—Limbach & Limbach L.L.P.

[57] ABSTRACT

A method for efficiently updating the coefficients of an adaptive equalizer in the situation of a propagation environment having a dynamically varying multipath. The invention is intended for use in the situation of a static direct path, dynamic multipath, and narrow band signal (bandwidth <<carrier frequency). The method of the present invention is based on the inventor's recognition of the cyclical (rotating) nature of the received signal arising from the effect of small changes in the dynamic multipath delay on a phase term which is part of the received signal. This led the inventor to conclude that the coefficients of the adaptive equalizer would exhibit a similar cyclical behavior. The cyclical behavior of the equalizer coefficients is incorporated into an LMS type coefficient update equation by multiplying the standard coefficient by a "predictive" functional term having a rotational behavior (e.g., $e^{j\Phi}$). Update equations for the equalizer coefficients and the rotation term are then developed. As the behavior of the update equations stabilizes, the modified coefficient values converge to terms having a rotational phase behavior arising from the effect of the dynamic multipath delay factor, d(t). This causes the output of the equalizer to more closely approach that of the transmitted signals, enabling the adaptive equalizer to compensate for the effects of the dynamic multipath environment.

5 Claims, 11 Drawing Sheets

ROTATIONALLY PREDICTIVE ADAPTIVE FILTER

TECHNICAL FIELD

The present invention is directed to digital communications systems, and more specifically, to adaptive equalizers used to compensate for amplitude and phase distortions of a transmitted pulse which are caused by a time dispersive channel.

BACKGROUND OF THE INVENTION

FIG. 1 shows the elements of a typical communications system 20, including the propagation environment. An original message, x(t), is input to a modulator 22 which modulates a carrier signal to encode the message. The modulated signal is input to a transmitter 24, producing a signal which propagates through a channel 26 to a receiver composed of a receiver front end 28, an IF stage 30, and a filter 32. Receiver front end 28 typically includes a tuner and a front end filter. Filter 32 is typically a low pass filter used to perform an anti-aliasing function. The various elements of the system contribute noise to the signal, which is modeled as an equivalent noise source 36 whose output, n(t), is added by adder 34 to the output of filter 32. The output of adder 34 is input to analog-to-digital converter 38, the output of which is the received signal, X(t). Thus, the received signal is the transmitted signal as modified by the response of the channel, with the addition of noise components. The noise may arise from sources such as the transmitter filter, the propagation medium, or the receiver filter(s).

The received signal X(t) is input to a matched filter 40, which is designed to correct the signal for the effects of propagation channel 26. This is accomplished by designing the matched filter to have a transfer function which is the inverse of that of the channel. The output of matched filter 40 is input to a decision making element, termed a decision device 41 in the figure. Decision device 41 (sometimes termed a "quantizer" or "slicer") is used to determine which symbol contained in the original message x(t) was transmitted during the sampling period. This is typically accomplished by applying a set of decision thresholds to the received signal X(t). The output of decision device 41 is the received message, which is desired to be as close to x(t) as possible.

Channel 26 represents all of the possible propagation paths which contribute to the received signal. These include direct paths between the transmitter and receiver and indirect or multipaths, wherein the transmitted signal reflects off of a surface prior to being received. A multipath may be either static (resulting from a reflection off of a fixed structure) or dynamic (resulting from reflection off of a moving structure). FIG. 2 shows the relationship between transmitter 24, receiver 28 (represented by the receiver front end of FIG. 1) and direct path 42, static multipath 44, and dynamic multipath 46.

When the transmitted signal reflects off of an object to form a multipath signal, the reflected signal forms an additional component of the total received signal. This additional signal may have a different amplitude and/or phase than the transmitted signal depending upon the location, motion, and electrical characteristics of the reflecting body. For the case of dynamic multipath 46, the channel response varies with time as the reflector properties (e.g., location and reflectivity as a function of incidence angle) change, forming dynamic amplitude and phase (delay) terms which contribute to the final received signal. For example, the motion of the reflecting object over time causes a change in the length of the propagation path for the reflected signal. This is manifested as a change in the phase of the reflected signal, with the time derivative of the phase change being an added frequency component of the received signal. Linear amplitude and phase dispersion of pulses propagating through the channel broadens the transmitted pulses and can cause them to interfere with each other. This is termed "intersymbol interference".

One method of compensating for the dispersive effects of the channel and the resulting intersymbol interference is to use an equalizer. An equalizer is a filter having fixed or variable coefficients which is placed in the path of the received signal. It is used to correct the received signal by compensating for the average range of expected amplitude and delay characteristics caused by a time dispersive channel, thereby reducing intersymbol interference. An adaptive equalizer is a filter having adjustable coefficients which are automatically updated to provide a better fit to the characteristics of a channel. This form of equalizer is particularly useful when attempting to compensate for the effects of a dynamic channel. An ideal equalizer functions as a matched filter to the characteristics of the channel, i.e, it has the inverse transfer function to that of the channel.

FIG. 3 is a block diagram showing a communications system 50 which includes an adaptive equalizer 52 placed in the path of a received signal X(t). Adaptive equalizer 52 is used to compensate for the effects of a time dispersive channel. Equalizer 52 acts to correct the received signal X(t) in a manner which removes the time dispersive effects of the channel, thereby causing the input to decision device 41 (and hence the output) to be closer to the transmitted signal x(t). Note that in FIG. 3, the matched filter of FIG. 1 is absent. This is because the channel characteristics are presumed to be varying and hence unknown, thus a matched filter is not available. Instead, low pass filter 31 (designed to filter out-of-band noise) or another filter placed in the signal path between the analog-to-digital converter and the equalizer, based on the best available approximation to the inverse of the channel transfer function, may be used.

The output of filter 31 is again added to an equivalent noise term n(t) to produce the input to analog-to-digital converter 38, the output of which is the received signal X(t). The received signal X(t) forms an input to adaptive equalizer 52. Adaptive equalizer 52 is a filter having variable coefficients which is capable of varying those coefficients to minimize the noise and intersymbol interference at its output. The output of adaptive equalizer 52 (termed Y(t) in the figure) is applied to decision device 41 which is again used to determine which symbol was transmitted during the sampling period. The adaptation behavior of equalizer 52 is driven by an error signal $\epsilon(t)$ provided by adder 54.

As shown in the figure, the output of decision device 41 is used to generate the error signal produced by adder 54, with the other input to adder 54 being the output of adaptive equalizer 52. In the absence of intersymbol interference and noise, the input to decision device 41 would equal the transmitted symbols x(t), and the output of the decision device would equal its input. In such a case the there would be no error and the error signal input to adaptive equalizer 52 would be zero. Thus, the coefficients of the equalizer would remain constant. In the form shown in FIG. 3, the adaptive equalizer uses the presumed noise and intersymbol interference free representation of the transmitted symbols produced at the output of decision device 41 to represent the desired output, and the output of the equalizer as the actual output. This is possible because the decision device rarely makes mistakes and the relatively long averaging time of the equalizer coefficient adjustment algorithms causes the errors to have an insignificant effect.

The equalizer in the communications system of FIG. 3 operates in what is termed a "decision directed" mode. This is because the equalizer error signal ϵ(t) is a function of the output of decision device 41. However, there is a class of equalizer update methods termed "blind algorithms" in which the error term is generated from the equalizer output without use of the output of the decision device. Blind mode methods are typically used at the start of an adaptation process, with the equalizer being switched to a decision directed mode of operation after some amount of convergence.

During initial adaptation of the equalizer coefficients, intersymbol interference can cause a high error rate. For this reason a training signal 56 rather than the decision device output may be used to provide the error signal and cause initial convergence of the coefficient values. If a training signal is not available, a blind mode algorithm may be used. As mentioned previously, the goal of using an adaptive equalizer is to vary the filter coefficients in such a manner as to provide an optimal solution to the problem of finding a matched filter to the characteristics of the channel and noise sources.

Adaptive equalizer 52 of FIG. 3 can take many forms. A common one is that of a finite impulse response (FIR) filter, also referred to as a linear transversal or tapped-delay line filter. FIG. 4 shows the primary functional components of a linear transversal filter 100 having fixed filter coefficients. Filter 100 is composed of a set of connected coefficient taps 110, of the form shown in FIG. 4(b). The primary functional elements of the filter are unit-delay element 102, multiplier 104, and adder 106. Unit-delay element 102 is identified by the unit-delay operator $z^{-1}$, which is defined as follows:

$$z^{-1}[X(n)]=X(n-1),$$

where X(n) is the input function at time slice n. Thus, when $z^{-1}$ operates on a signal input to the filter, it produces a delayed representation of the input waveform at the next tap of the filter. Thus, progressively later taps of the filter have as inputs signals which are progressively more delayed, and hence previous to the current signal. Multiplier 104 is used to multiply a weighting filter coefficient $W_i$ times the delayed input signal. Adder 106 acts to sum the weighted values and produce the output, Y(n), of the filter, which is a linear combination of weighted versions of signals at previous times to the current signal. The general form of Y(n) is given by:

$$Y(n) = \sum_i W_i X(n - i).$$

The filter shown in FIG. 4 has fixed coefficients. Thus it is not an adaptive filter and does not vary the weightings of the delayed signals to obtain a better fit to the characteristics of the channel.

FIG. 5 shows the primary functional components of an adaptive linear transversal filter 120. Filter 120 is composed of a set of connected coefficient taps 130, of the form shown in FIG. 5(b). The primary functional elements of the filter are unit-delay element 122, multiplier 124, adder 126, and coefficient update block 128.

An input signal 132 to filter 120 is applied to delay element 122. As noted when discussing the fixed coefficient filter of FIG. 4, the delay elements act to delay the input signal by a unit delay time, propagating a progressively more delayed signal down the filter taps. As before, multiplier 124 is used to multiply a weighting filter coefficient $W_i$ times the delayed input signal. Adder 126 acts to sum the weighted values and produce the output, Y(n), (element 134) of filter 120. However, in contrast to the fixed coefficient filter of FIG. 4, filter coefficients $W_i$ are updated by an adaptive algorithm contained in coefficient update block 128 to better approximate the characteristics of the channel.

Coefficient update block 128 has error signal 136, input signal 132 (X(n)), and the result of operating on the present coefficient value by the $z^{-1}$ operator (shown as $W_i$ in the figure) as inputs. Thus, coefficient update block 128 generates an updated coefficient value $W_n(t+1)$ from that coefficient's previous value $W_n(t)$ according to the equation:

$$W_n(t+1)=W_n(t)+\Delta W_n(t)$$

where $\Delta W_n(t)$ is the change in the coefficient value determined by the update block.

Error signal 136 is derived from the difference between the output of the adaptive equalizer and a signal representing the transmitted signal (either an exact replica or a signal representing some characteristic of the transmitted signal, such as the output of the decision device). Note that error signal 136 is a function of filter output Y(n) 134. This means that coefficient value $W_i$ is a function of the received signals at previous times.

The operation of the update block in determining $\Delta W_n(t)$ is typically described in terms of an update equation which shows how the next value of the coefficient is calculated based on the present value, the error term, and any other relevant parameters. The update equation is a recursive relationship from which a later value of an adaptive equalizer coefficient may be determined based in part on its current value.

A commonly used method for updating a set of adaptive coefficients is the least-mean-squares or LMS algorithm. The LMS algorithm adjusts the filter coefficients in a manner which seeks to minimize the mean square error between the desired signal (as typically represented by a training signal or the output of the decision device) and the output of the equalizer. Since the mean square error is a quadratic function of the weights, adjusting the coefficients to minimize the mean-square error can be visualized as attempting to reach the bottom of a hyper-paraboloidal surface by descending along its sides. As is well known, gradient methods are typically used to perform this operation. The LMS algorithm is an implementation of one of these gradient methods known as the method of steepest descent. A recursive update equation relating the value of a filter coefficient $W_i$ at time (t+1) to its value at time (t) which is based on an LMS algorithm is given by:

$$W_i(t+1)=W_i(t)+\mu\epsilon(t)X_i^*,$$

where $\mu$=adaptation constant which controls the step size and hence rate of convergence of the coefficients;

$\epsilon$(t)=error signal value at time t; and $X_i^*$ =complex conjugate of ith component of received signal at time t.

FIG. 6 is a block diagram representing the data flow and operations which are performed by the above LMS coefficient update equation. The elements of the adaptive equalizer which perform the operations shown inside the dotted box of FIG. 6 are part of coefficient update block 128 of FIG. 5. As shown in FIG. 6, update block 128 contains an adder 128a and a multiplier 128b. The inputs to multiplier 128b are a conjugate of the component of the received signal, $X_i^*$, and the error term, $\epsilon(t)$, or more properly the product of the adaptation step size parameter $\mu$ and the error term. The output of multiplier 128b is thus the term $\mu^*\epsilon(t)^*X_i^*$. This is the update term, $\Delta W_n(t)$, which is added to the current value of the coefficient by adder 128a to obtain the updated coefficient value. The current coefficient value is the one previous to the new value being determined and is provided by operating on the result of the previous iteration of the update block with the $z^{-1}$ operator. The output of update block 128 is the new value for the filter coefficient, $W_i(t+1)$.

An important aspect of LMS based update equations are that they have a computational complexity on the order of N, where N is the filter size (the number of filter coefficients), because 2N+1 computations are required per iteration. Another important feature of LMS equations is that they utilize a fixed adaptation constant. The fixed value for $\mu$ determines the convergence rate for the method, generally making it somewhat slow. The slow convergence rate affects the tracking performance of LMS algorithms. This is an important feature because when an adaptive filter algorithm is used in a non-stationary (i.e., dynamic) environment the algorithm must be capable of tracking statistical variations in that environment to obtain a solution for the coefficients which minimizes the error. However, the tracking performance is affected by two competing factors: (1) the rate of convergence; and (2) steady state fluctuation in the coefficient values as a result of algorithm noise (a higher convergence rate increases the fluctuation in the coefficients).

The competing behaviors arise because the LMS update equation indicates that the rate of change (i.e., the rate of convergence) of the coefficient, W, is proportional to $\mu$. Thus, a larger value of $\mu$ increase the convergence rate. However, the error term $\epsilon(t)$ includes a noise component. This introduces noise into the coefficients, in proportion to $\mu$, which is the multiplicative factor for $\epsilon(t)$. This noise component of the equalizer coefficients produces the steady state fluctuation in the coefficient values. Since the noise in the coefficients is proportional to $\mu$, the steady state fluctuation is also proportional to $\mu$. Thus, to reduce the noise component of the coefficients, a smaller value of $\mu$ is used. One result of these competing factors is that in a dynamic environment, LMS based update equations have significant disadvantages and are not an optimal method of determining the adaptive coefficients.

Another type of update equation which exhibits faster convergence and better tracking ability than those based on the LMS method is one based on recursive least squares (RLS) algorithms. The faster convergence results from the availability of a greater number of adjustable parameters than the single one found in LMS algorithms. RLS algorithms seek to minimize the time-average weighted mean square error between the actual signals transmitted through the channel (x(t)) and the signals output after propagation through the channel and adjustment by the equalizer (the product of the equalizer weights and the received signal, X(t)). A recursive update equation relating the value of a filter coefficient $W_i$ at time (t+1) to its value at time (t) which is based on a RLS algorithm is given by:

$$W_i(t+1) = W_i(t) + \epsilon(t) M(t) X_i^*,$$

where $\epsilon$ = error signal value at time t;

M(t) = autocorrelation matrix between received signal components, X(t); and $X_i^*$ = complex conjugate of ith component of received signal at time t.

An update equation based on a standard RLS algorithm has a computational complexity on the order of $N^2$, where N is the filter size (the number of filter coefficients). This is because it requires $2.5N^2+4.5N$ computations per iteration. Such algorithms generally exhibit a faster rate of convergence than LMS based algorithms and improved tracking ability, making them better suited to applications having a tracking requirement such as dynamic propagation environments. The improved tracking ability is obtained from the existence of a weighting value contained in the expression for the autocorrelation matrix, M(t). The smaller the value of this weighting term, the better the tracking ability. However, if the value of the term is too small, the algorithm becomes unstable.

A primary disadvantage of RLS algorithms is the high level of computational complexity required to implement them. For this reason, modified RLS algorithms, generally having a complexity on the order of N have been developed. These algorithms retain the good convergence and tracking behavior of standard RLS algorithms, but have the additional advantage of lower computational requirements. However, a disadvantage of many modified RLS algorithms is that they require complex programming methods and may be numerically unstable. In addition, modified RLS algorithms may not be well-suited for obtaining optimal performance in a particular environment. In general, the additional computational complexity of RLS based algorithms makes update equations based on such methods more expensive to implement and less computationally efficient than is practical for some applications.

What is desired is a method for updating the coefficients of an adaptive equalizer used to correct for channel distortions caused by a dynamically varying multipath which provides better tracking performance than standard LMS based methods and has a lower computational complexity than standard RLS based methods.

SUMMARY OF THE INVENTION

The present invention is directed to a method for efficiently updating the coefficients of an adaptive equalizer in the situation of a propagation environment having a dynamically varying multipath. The invention is intended for use in the situation of a static direct path, dynamic multipath, and narrow band signal (bandwidth <<carrier frequency). The method of the present invention is based on the inventor's recognition of the cyclical (rotating) nature of the received signal which arises from the effect of small changes in the dynamic multipath delay on a phase term which is part of the received signal. This led the inventor to conclude that the coefficients of the adaptive equalizer would exhibit a similar cyclical behavior. The cyclical behavior of the equalizer coefficients is incorporated into an LMS type coefficient update equation by multiplying the standard coefficient by a "predictive" functional term having a rotational behavior (e.g., $e^{j\phi}$). Update equations for the equalizer coefficients and the rotation term are then developed. As the behavior of the update equations stabilizes, the modified coefficient values converge to terms which incorporate a rotational phase behavior, representing the effect of the dynamic multipath delay factor, d(t). This causes the output of the equalizer to more closely approach that of the decision device, enabling the adaptive equalizer to better compensate for the effects of the dynamic multipath environment.

Further objects and advantages of the present invention will become apparent from the following detailed description and accompanying drawings.

DETAILED DESCRIPTION OF THE INVENTION

Figure 1:
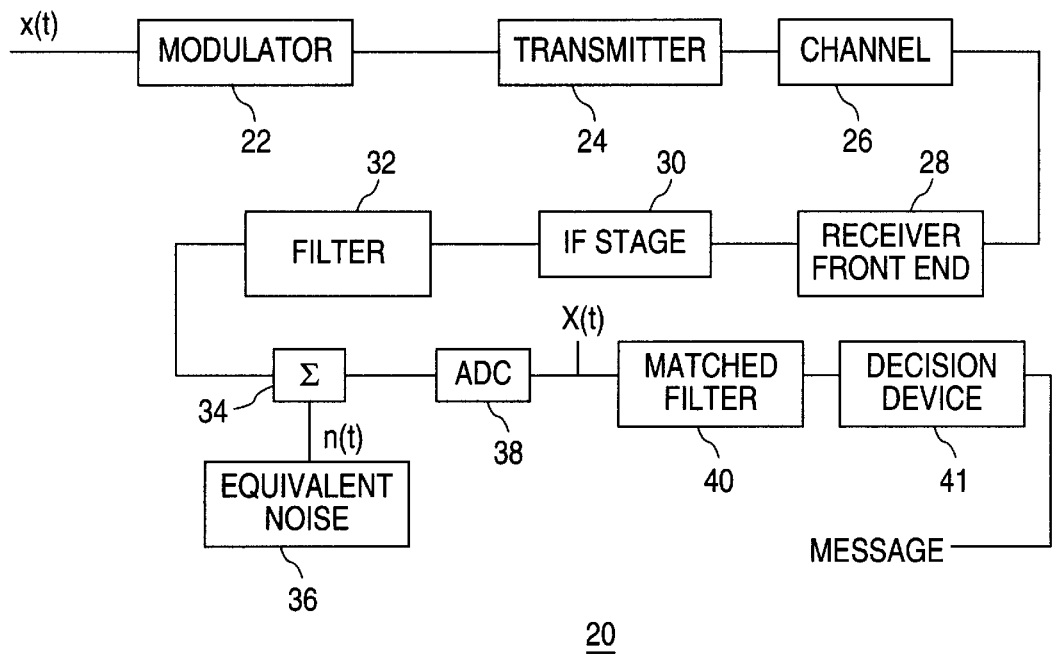
FIG. 1 shows the components of a typical propagation environment.
Figure 2:
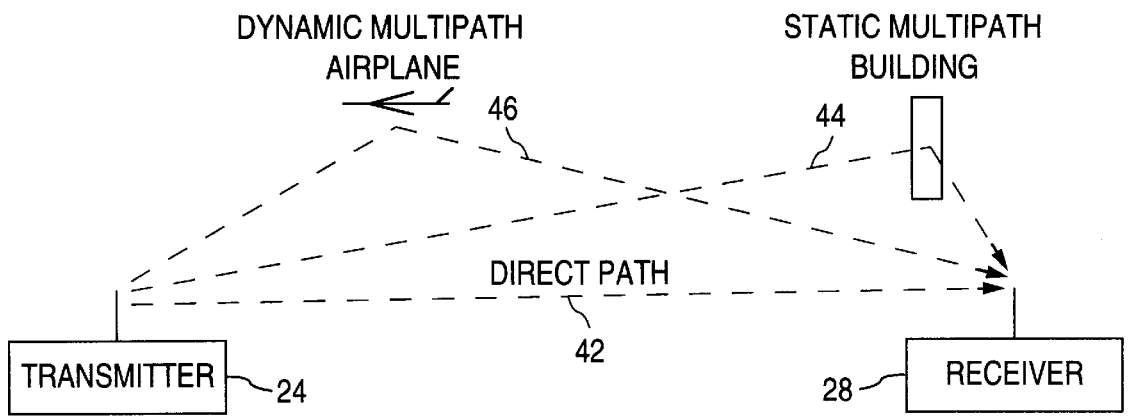
FIG. 2 shows the relationship between a transmitter, receiver, direct path, static multipath, and dynamic multipath.
Figure 3:
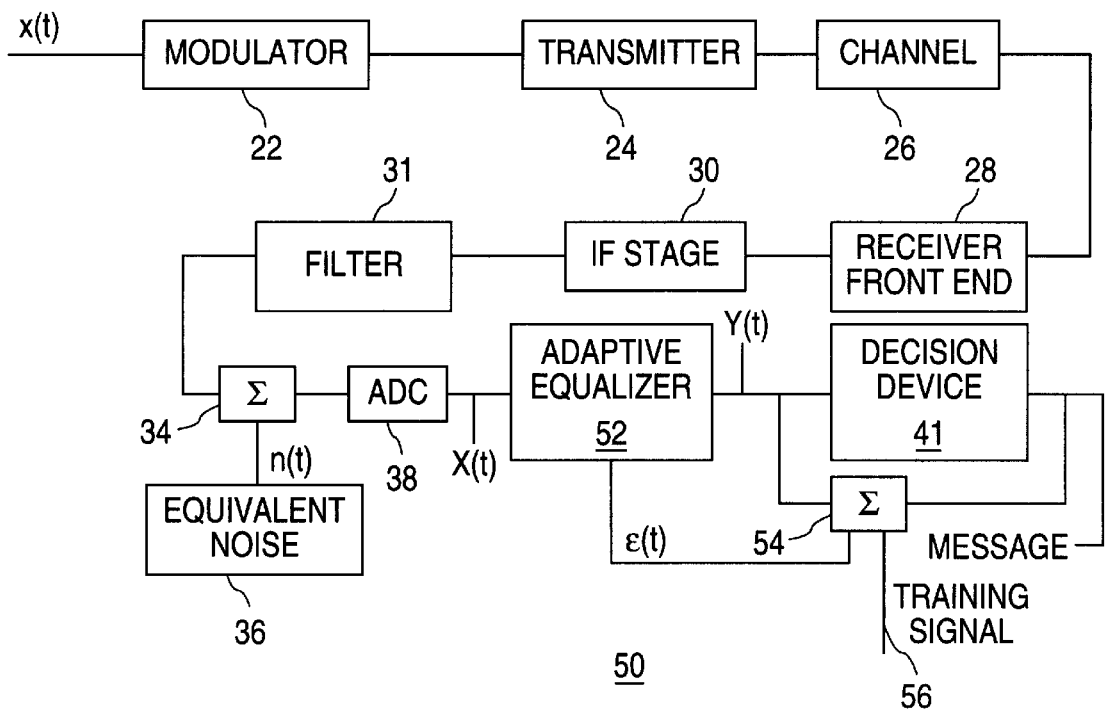
FIG. 3 is a block diagram showing an adaptive equalizer placed in the path of a received signal which is used to compensate for the effects of a dispersive channel.

The inventor of the present invention has recognized that small changes in the value of a delay term used to model a dynamic multipath which contributes to a time dispersive channel causes the values of the received signal to undergo a cyclical variation. This variation results from a phase term which depends upon d(t), the delay introduced by the multipath. The cyclical nature of the received signal permits the adaptive equalizer coefficients to be modeled in a manner which produces a numerically stable, computationally efficient update process and exhibits better tracking behavior than standard LMS methods.

To begin with, define the following:

| | |
|---|---|
| $x(t)$ | : transmitted signal; |
| $x_m(t)$ | : modulated transmitted signal; |
| $r(t)$ | : received signal; |
| $r_m(t)$ | : modulated received signal; |
| $h(t)$ | : channel impulse response; and |
| $w_m$ | : carrier frequency, then |
| $x_m(t)$ | $= x(t)*e^{iw_m t}$; |
| $r_m(t)$ | $= x_m(t) * h(t)$; and |
| $r(t)$ | $= r_m(t)*e^{-iw_m t}$. |

For a dynamically varying multipath, a suitable model of the channel impulse response is given by:

$$h(t)=\delta(t)+a(t)\,\delta(t-d(t)),$$

where a(t)=dynamic amplitude (an attenuation factor) and d(t)=dynamic delay. The second term of the dynamic channel response represents the amplitude and phase variation caused by the multipath in the signal input to the channel. It is noted that the present invention may be used with different channel impulse response models, and that the model used in the following description is for purposes of illustrating the problem solved by, and the method of the present invention.

Given the described channel impulse response, the expression for r(t) becomes:

$$r(t) = (x(t)*e^{iw_m t})*(\delta(t) + a(t)\delta(t - d(t)))*e^{-iw_m t},$$
$$r(t) = (x(t)*e^{iw_m t}) + a(t)x(t - d(t))e^{iw_m(t-d(t))}e^{-iw_m t}$$
$$r(t) = x(t) + (a(t)x(t - d(t))e^{-iw_m d(t)}.$$

As can be seen from the last equation, the dynamic multipath environment introduces a term in the received signal having a phase variation which is proportional to d(t), i.e., $e^{-iw_m d(t)}$. As d(t) changes with time, the channel model undergoes a rotation. The phase change over time introduces a frequency shift into the signal. This produces a time varying intersymbol interference. The result is a situation in which a standard LMS algorithm would be unable to track the channel behavior with sufficient speed to produce an accurate update of the equalizer coefficients. The inventor recognized that one way of dealing with this problem is to modify the equalizer coefficients to introduce a rotational behavior which cancels that of the channel model.

In some situations of interest, the signal bandwidth can be approximately 1 MHz, while the carrier frequency is approximately 1 GHz. Thus, in such a case the ratio of bandwidth to carrier is about 1:1000. In this situation, a small variation in the value of d(t) causes a complete rotation (a change in $2\pi$) in the value of the phase term. This is most evident by normalizing the wm term for this situation, so that wm=$2\pi$*1000. Then, a change in d(t) on the order of 1/1000 causes the phase term to undergo a complete cycling through all of its values. Note that other changes in the factors contributing to the value of the received signal on the order of 1/1000 produce only small changes in the signal.

The predominant effect of the dynamic multipath induced portion of the channel response is to cause the channel response model to cycle through a set of repeating values. Because of the dependence of the adaptive equalizer coefficient values on the received signal (which is the channel input convolved with the channel response), the inventor of the present invention recognized that the behavior of the coefficients could be modeled as having some form of cyclical dependence, i.e., the coefficients cycled through a set of values. The inventor also recognized that this repetitive characteristic could be used as the basis for a way of "predicting" the contribution to the adaptive filter coefficients from the dynamic multipath terms, thus providing a more efficient method of updating those coefficients.

Figure 7A:
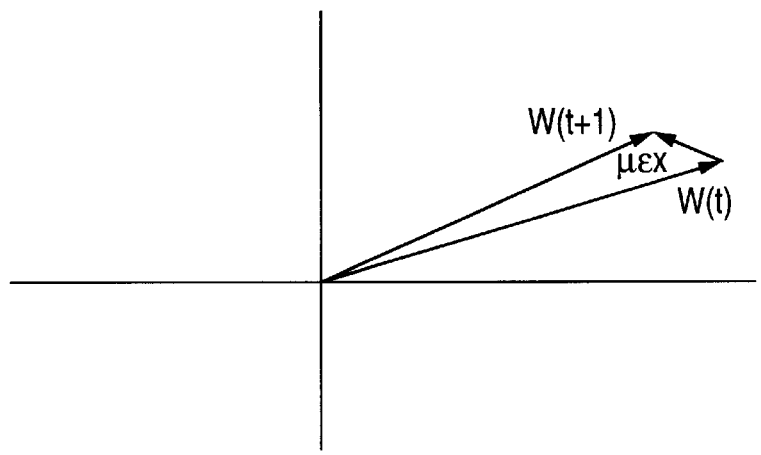
FIGS. 7A–7D are diagrams showing vector representations of the coefficient update process.
Figure 7B:
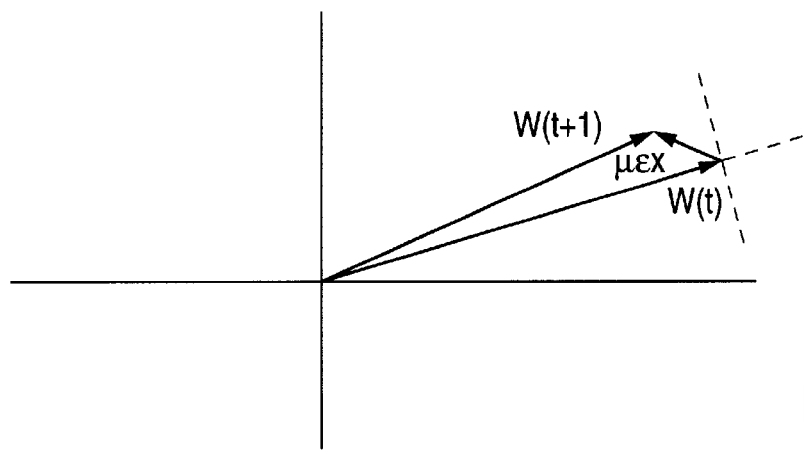
Figure 7C:
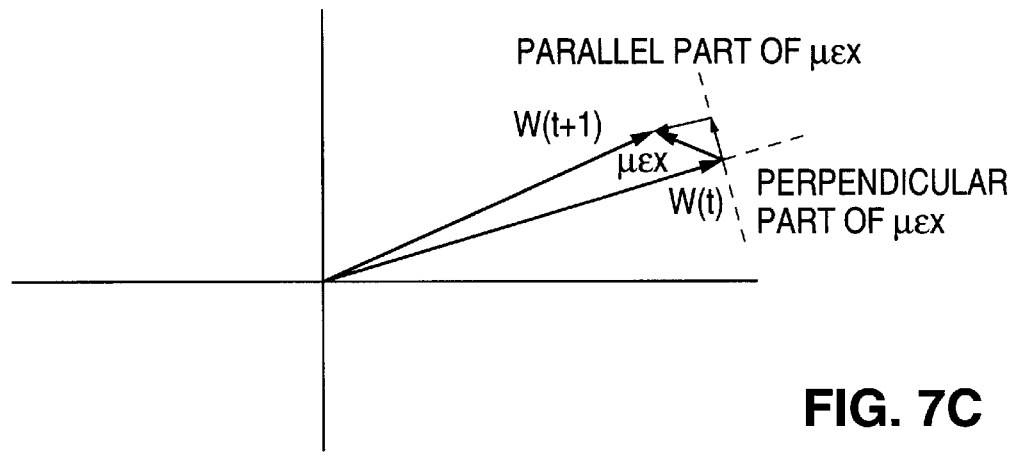
Figure 7D:
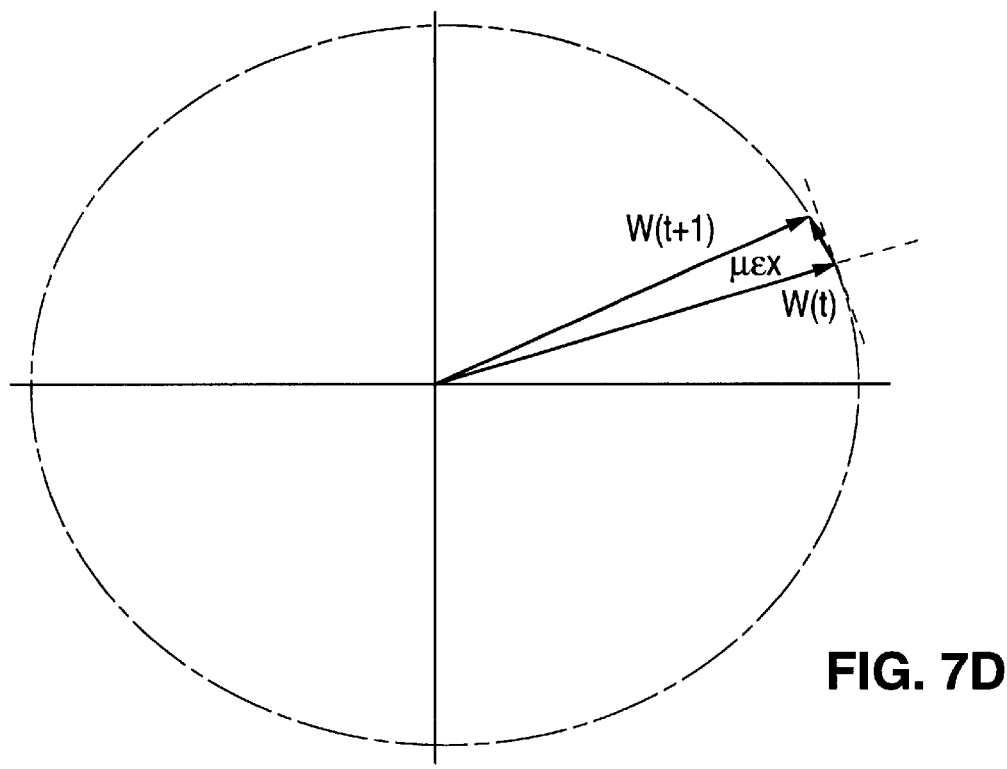

The updating process for the coefficients of an adaptive equalizer can be understood more clearly by illustrating the behavior of a coefficient update equation in the form of a vector diagram in the complex plane. FIG. 7A shows the standard LMS update equation, $$W_i(t+1)=W_i(t)+\mu\epsilon X_i^*,$$

in the form of a vector diagram. As shown, the final vector representing the updated coefficient, W(t+1) is the vector sum of the initial coefficient value, w(t) and the update portion, $(\mu\epsilon X_i^*)$. FIG. 7B shows the same vectors and vector addition as FIG. 7A but with a set of perpendicular axes positioned at the tip of the W(t) vector. This causes the W(t) vector to be oriented parallel to one of the axes. FIG. 7C shows the same vectors as FIG. 7B, but with the update vector ($\mu \epsilon X_i^*$) decomposed into perpendicular and parallel components with respect to the axes. FIG. 7D shows that for a "rotating" coefficient having an approximately constant magnitude but a varying phase term, the contribution of the update term can be visualized as coming primarily from the perpendicular component of the update term. A measure of the perpendicular component can be obtained from a function of the update term and the coefficient. A possible implementation of this functional dependence (and the one used in this invention) is to take the imaginary portion of the product of the update term and the complex conjugate of the coefficient.

The goal of the present invention is to provide an efficient method for compensating for the effects of a dynamic multipath environment on a propagating signal. The invention is intended for use in the situation of a static direct path and narrow band signal (bandwidth <<carrier frequency). The method of the present invention is based on the inventor's recognition of the cyclical (rotating) nature of the received signal which results from the effect of small changes in the dynamic multipath d(t) term on a phase term ($e^{-iwmd(t)}$) which is part of the received signal. This led the inventor to conclude that the effects of the time dispersive channel could be removed by having the coefficients of the adaptive equalizer exhibit a similar cyclical or rotating behavior. The cyclical behavior of the equalizer coefficients is incorporated into an LMS type coefficient update equation by means of a "predictive" functional term which modifies the standard coefficients by introducing a rotational behavior. In the preferred embodiment, a rotation term ($e^{j\Phi}$) is used as a multiplicative factor to modify the standard coefficients. Update equations for the equalizer coefficients and the rotation term can then be developed. As the behavior of the update equations stabilizes, the modified coefficient values converge to terms which demonstrate a rotational behaving phase which arises from the dynamic multipath factor, d(t). This causes the output of the equalizer to more closely approach the values of the transmitted signals, enabling the adaptive equalizer to better compensate for the effects of the multipath environment.

In accordance with the present invention, an update equation for a coefficient $W_i(t)$ of an adaptive equalizer is given as:

$$W_i(t+1) = P_i(t)^* W_i(t) + \mu \epsilon X_i^*, \quad (1)$$

where $P_i(t)$ represents a "predictive" factor derived from the observed rotational behavior of the received signal as a function of the dynamic multipath terms. The $P_i(t)$ term is included to introduce the expected cyclical behavior of the equalizer coefficients into the update equation. Thus, in this implementation of the present invention, a rotationally varying term, $P_i(t)$, is appended to the normal coefficient, $W_i(t)$, to produce the cyclical behavior expected of the coefficients in the dynamic multipath environment. This forms a modified LMS type update equation which incorporates a predictive rotational term.

Figure 8:
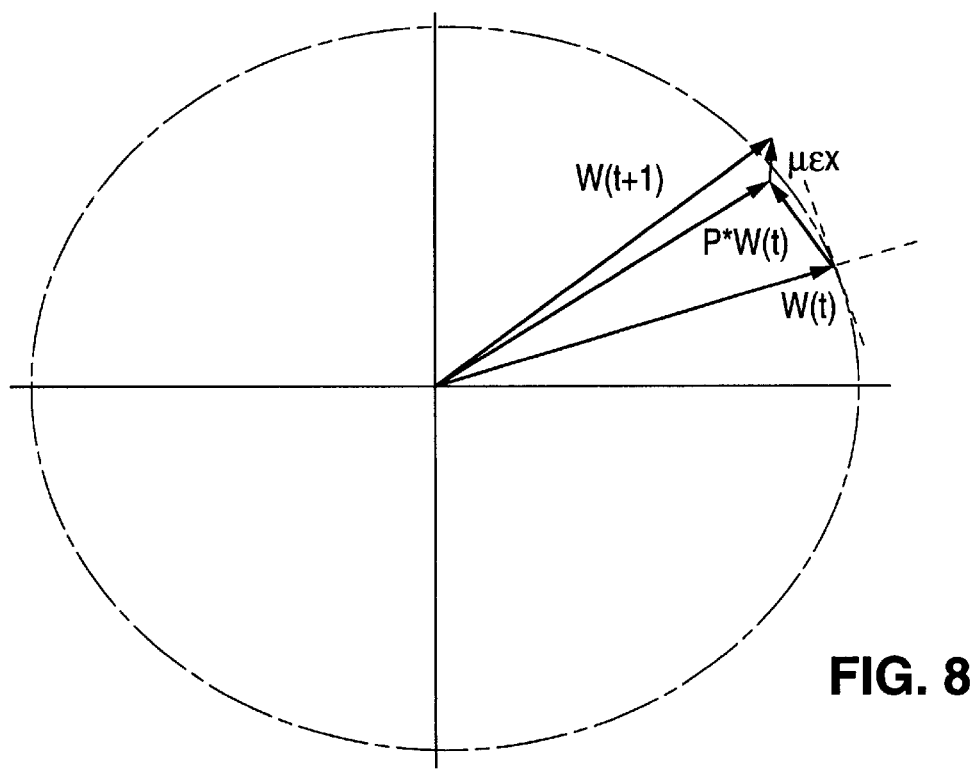
FIG. 8 is a diagram showing a vector representation of the update process of the present invention.

FIG. 8 is a polar diagram showing the vector components of the expression for $W_i(t+1)$ based on equation (1). Note that for real $P_i(t)$ equal to one and imaginary $P_i(t)$ small relative to the real part, the term $P_i(t)^* W_i(t)$ may be modeled as a rotation. Imaginary $P_i(t)$ will be small relative to the real part when the rate of change of the dynamic multipath, d(t), is small compared to the symbol rate. For example, with a symbol rate of a few Mhz, a carrier frequency of approximately 1 Ghz, and a dynamic multipath caused by an airplane traveling at a few hundred miles per hour, this requirement is satisfied.

Setting $P_i(t) = (e^{j\Phi})$ to model a rotation and expanding the expression using Euler's formula, $$P_i(t) = \cos \phi + j \sin \phi.$$

Now with [$\phi$] small (i.e., <<1), $$P_i(t) \approx 1 + j [\phi].$$

Substituting this expression into the one for $W_i(t+1)$ gives $$W_i(t+1) = (1 + j [\phi])^* W_i(t) + \mu \epsilon X_i^*.$$

Since sin $\phi$=imaginary part of $e^{j\Phi}$, then for small ø, the imaginary part of $P_i(Pim_i) \approx \phi$. Substituting this into the expression for $W_i(t+1)$ gives:

$$W_i(t+1) = (1 + j^* Pim_i(t))^* W_i(t) + \mu \epsilon X_i^*. \quad (2)$$

Thus, in this approach, the values of the equalizer coefficients are dependent upon the imaginary part of the predictive term ($Pim_i(t)$). As recognized by the inventor of the present invention, an update equation for $Pim_i(t)$ can be found by recalling that the predictive coefficient is derived from the perpendicular portion of the update portion of the equation, which may be modeled by taking the imaginary portion of the product of the update term and the complex conjugate of the coefficient. Referring to FIG. 8, this gives:

$$Pim_i(t+1) = Pim_i(t) - \text{imaginary} (\mu_p^* \mu^* \epsilon^* X_i^* W_i^*(t)). \quad (3)$$

In equation (3), $\mu_p$ represents a predictive adaptive coefficient constant which may to set to alter the convergence rate of the expression. Note that the combination of equations (2) and (3) provides two terms which may be varied to alter the behavior of the equations. This provides improved tracking behavior when compared to LMS based updating methods, while retaining the lower level of computational complexity of such methods.

Non-linear behavior of the error term in the form of additional functional dependence may be introduced into equations (2) and (3) in order to assist with implementation of the method and alter the behavior of the equations (convergence rate, numerical stability, etc.). This results in the following equations:

$$W_i(t+1) = (1 + j^* Pim_i(t))^* W_i(t) + \mu f_1(\epsilon)^* X_i^*; \quad \text{and}$$

$$Pim_i(t+1) = Pim_i(t) - \text{imaginary} (\mu_p^* \mu^* f_2(f_1(\epsilon)^* X_i^{**} W_i^*(t))).$$

In the above equations, the terms represents $f_1$, and $f_2$ represent functions which may be used modify the behavior of the coefficient update process. For example, options for the functions $f_1$ and $f_2$ include, but are not limited to,

| | |
|---|---|
| 1. f(x) = | x (no modification); |
| | 1 + j when re(x) ≥ 0 and im(x) ≥ 0 |
| | −1 + j when re(x) < 0 and im(x) ≥ 0 |
| 2. f(x) = sign(x) = | 1 − j when re(x) ≥ 0 and im(x) < 0 |
| | −1 − j when re(x) < 0 and im(x) < 0 |
| | 1 + j when re(x) > 0 and im(x) > 0 |
| | −1 + j when re(x) < 0 and im(x) > 0 |
| | 1 − J when re(x) > 0 and im(x) < 0 |
| | −1 − j when re(x) < 0 and im(x) < 0 |
| 3. f(x) = | 1 when re(x) > 0 and im(x) = 0 |
| | −1 when re.(x) < 0 and im(x) > 0 |
| | j when re(x) = 0 and im(x) > 0 |
| | −j when re(x) = 0 and im(x) < 0 |
| | 0 when re(x) = 0 and im(x) = 0 |
| 4. f(x) = | x/\|x\| when x ≠ 0 |
| | 0 when x = 0 |

Figure 6:
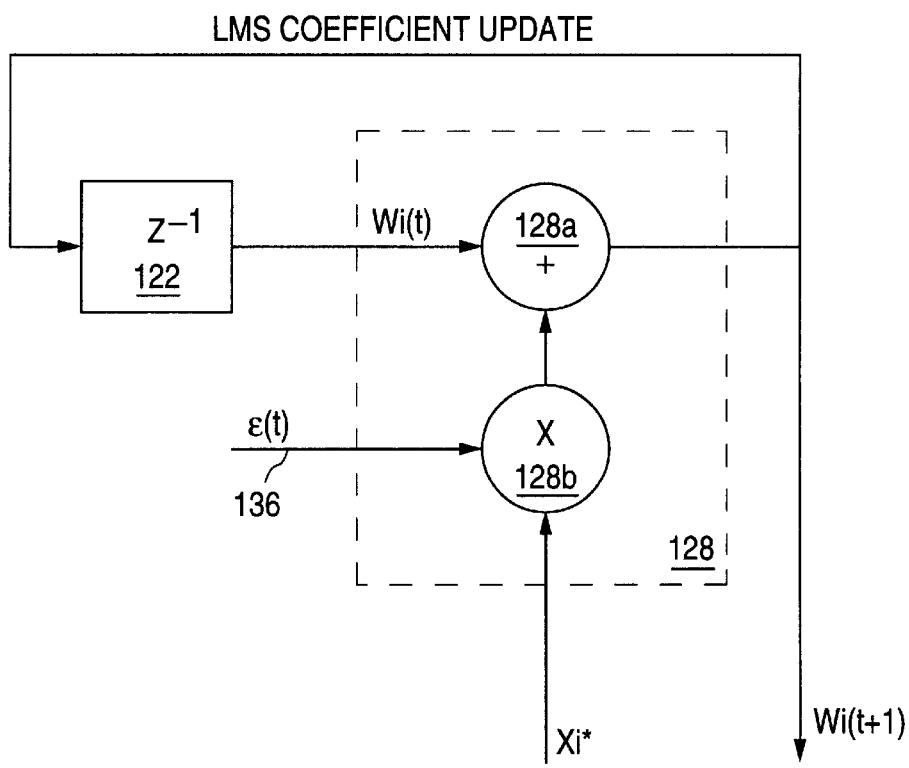
FIG. 6 is a block diagram representing the data flow and operations which are performed by an LMS based update equation.
Figure 4A:
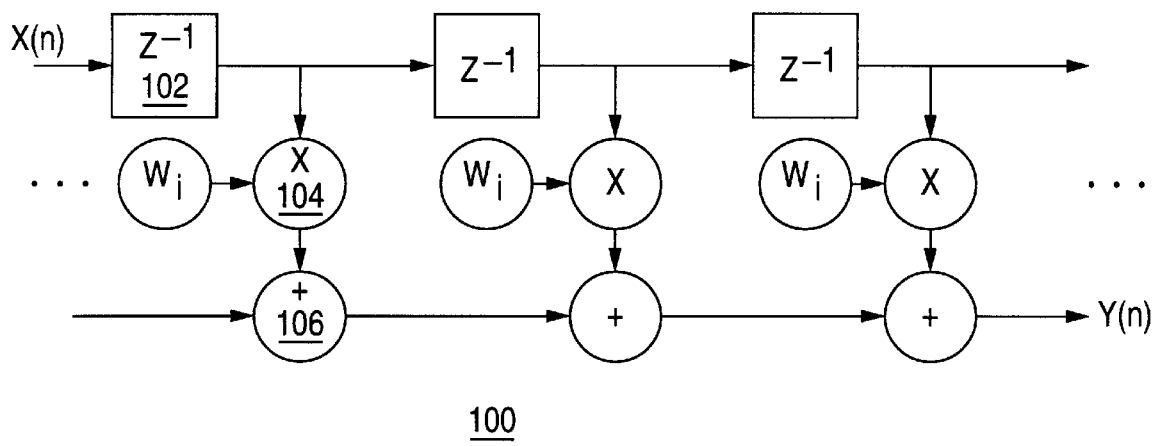
FIGS. 4A and 4B show the primary functional components of a linear transversal filter.
Figure 4B:
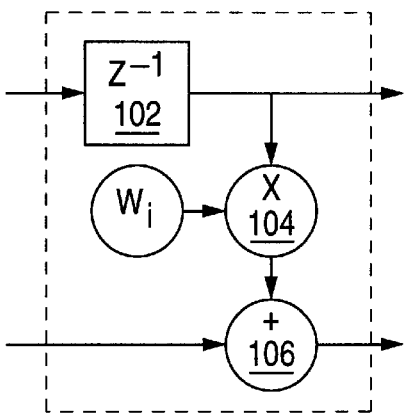
Figure 5A:
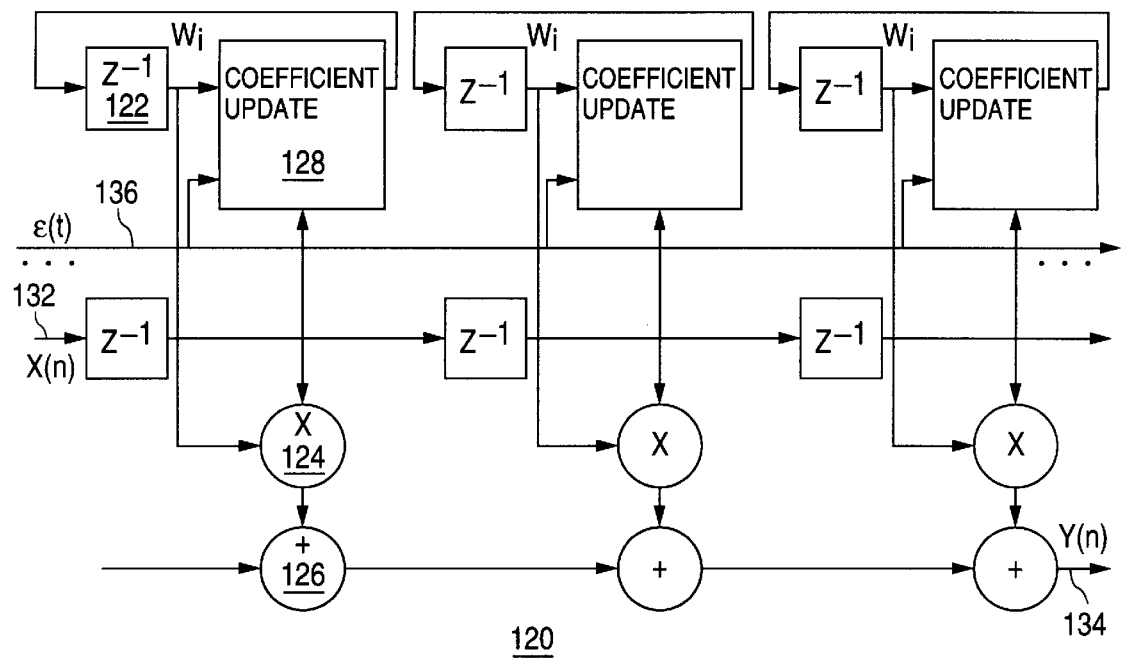
FIGS. 5A and 5B show the primary functional components of an adaptive linear transversal filter.
Figure 5B:
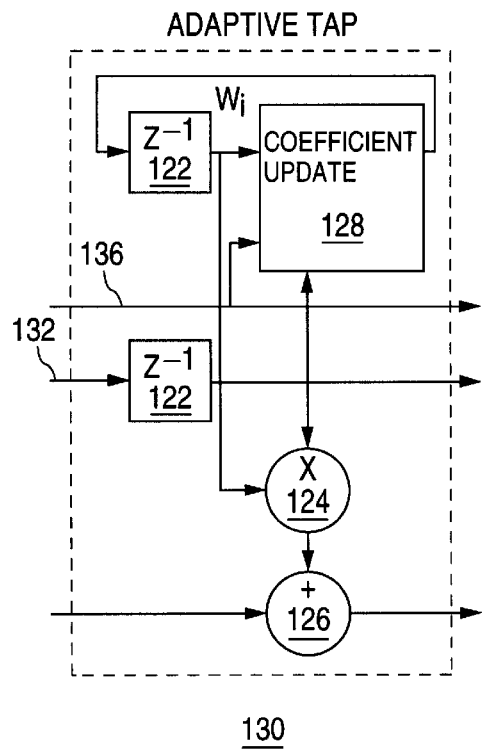
Figure 9:
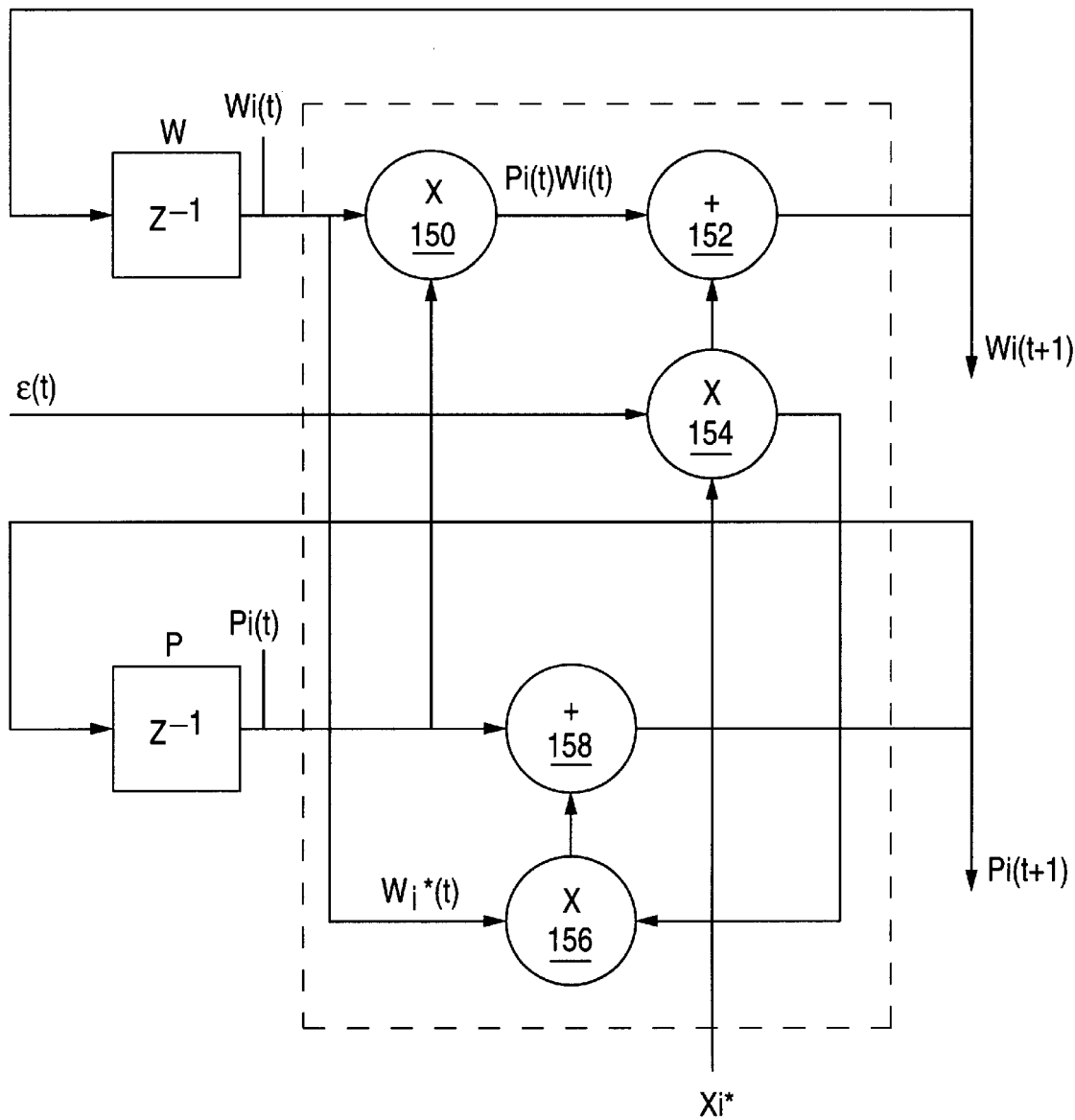
FIG. 9 is a block diagram representing the data flow and operations which are performed by the update equation of the present invention.

FIG. 9 is a block diagram representing the data flow and operations which are performed by the update equation of the present invention. The elements of the adaptive equalizer which perform the operations shown inside the dotted box of FIG. 9 are part of coefficient update block 128 of FIG. 5. As shown in FIG. 9, update block 128 contains two adders and three multipliers. The inputs to multiplier 150 are the previous value of the coefficient (as provided by a unit delay operator) and the previous value of the predictive coefficient term, Pi(t) (as provided by a unit delay operator). The output of multiplier 150 is thus the term Pi(t)*Wi(t). This term is added by adder 152 to the product of the conjugate of the component of the received signal, $X_i^*$, and the error term, $\epsilon(t)$, or more properly the product of the adaptation step size parameter $\mu$ and the error term. The output of multiplier 154 is thus the term $\mu^*\epsilon(t)^*X_i^*$. This is the update term, $\Delta W_n(t)$, which is added to the current value of the coefficient by adder 152 to obtain the updated coefficient value, Wi(t+1). In addition, as shown in the figure, the term Pi(t) is updated. The output of multiplier 154 ($\mu^*\epsilon(t)^*X_i^*$) is used as an input to multiplier 156. The other input is the term Wi(t) (or more properly, Wi* (t). Another input to multiplier 156 is $\mu_p$, the predictive adaptive coefficient constant (not shown in the figure). The output of multiplier 156 is thus the term ($\mu_p^*\mu^*\epsilon^*X_i^{**}W_i^*$ (t)). Adder 158 is then used to combine Pi(t) and the output of multiplier 156 to obtain the desired expression for Pi(t+l). Note that both FIG. 6 and FIG. 9 are intended only to generally illustrate the respective updating processes, and may not explicitly show how each operation used to form the updated coefficients or terms is implemented.

Given the two basic update equations of the present invention (equations (2) and (3) above), the method of the present invention can be implemented in a microprocessor written in a language such as C++, or in the form of a hardwired circuit in silicon using a hardware description language such as VHDL or Verilog, followed by synthesizing the required logic gates. Equations (2) and (3) are implemented in parallel for each of the filter coefficients. If implemented in the form of software code executed by a microprocessor, the method takes the form of a loop the size of the filter which executes the two equations. Recall that the term $P_i(t)^*W_i(t)$ in the inventive update equation is replaced by the expression $(1+j^*Pim_i(t))^*W_i(t)$. This reduces a complex multiply operation containing four real multiplies and two real additions to two real multiplies and two real additions. The multiplies by the convergence factors $\mu$ and $\mu_p$ are restricted to powers of two, so that they may be implemented by shifting bits.

The inventor of the present invention has evaluated the behavior of the predictive equalizer coefficient method described herein by modelling the update equation(s) using a computer simulation. The simulation clearly demonstrates the improved tracking characteristics of the inventive method compared to those of a standard LMS algorithm method.

Figure 10:
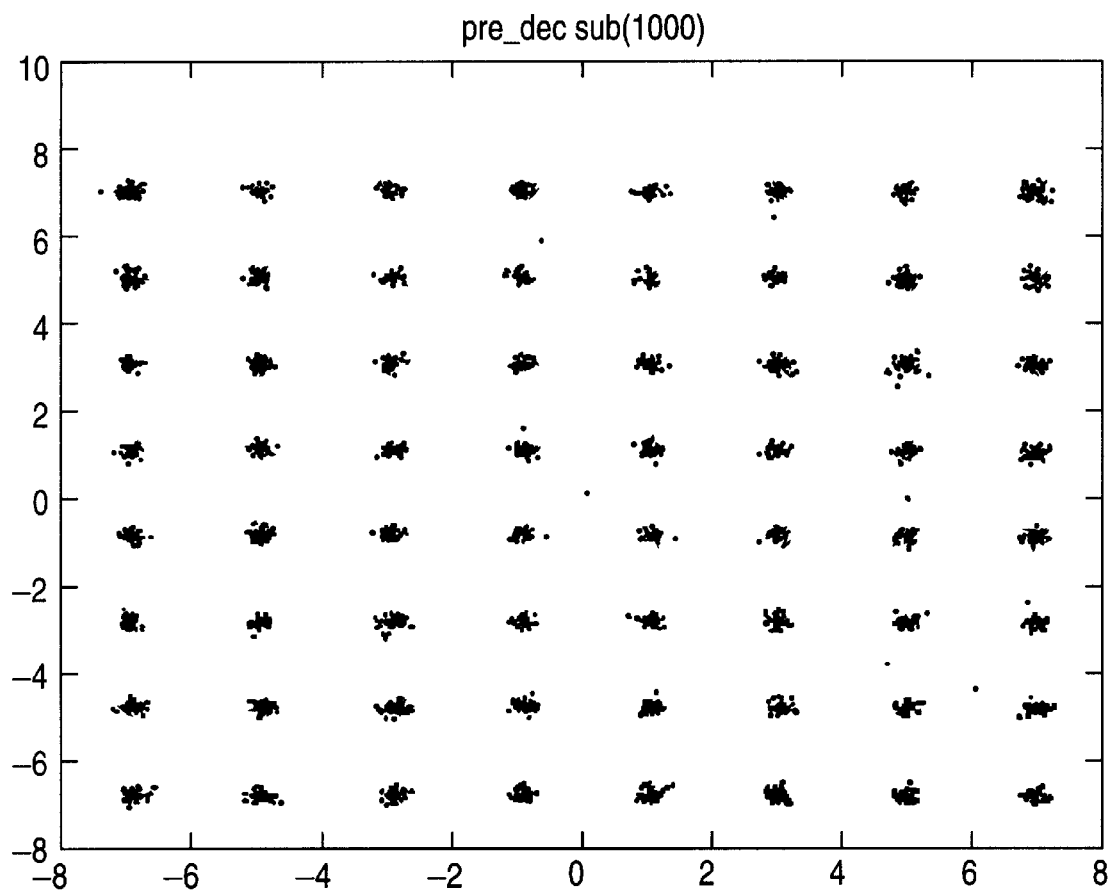
FIG. 10 is a scatter plot showing the output of the equalizer for a total of N iterations of the predictive update equation of the present invention.
Figure 11:
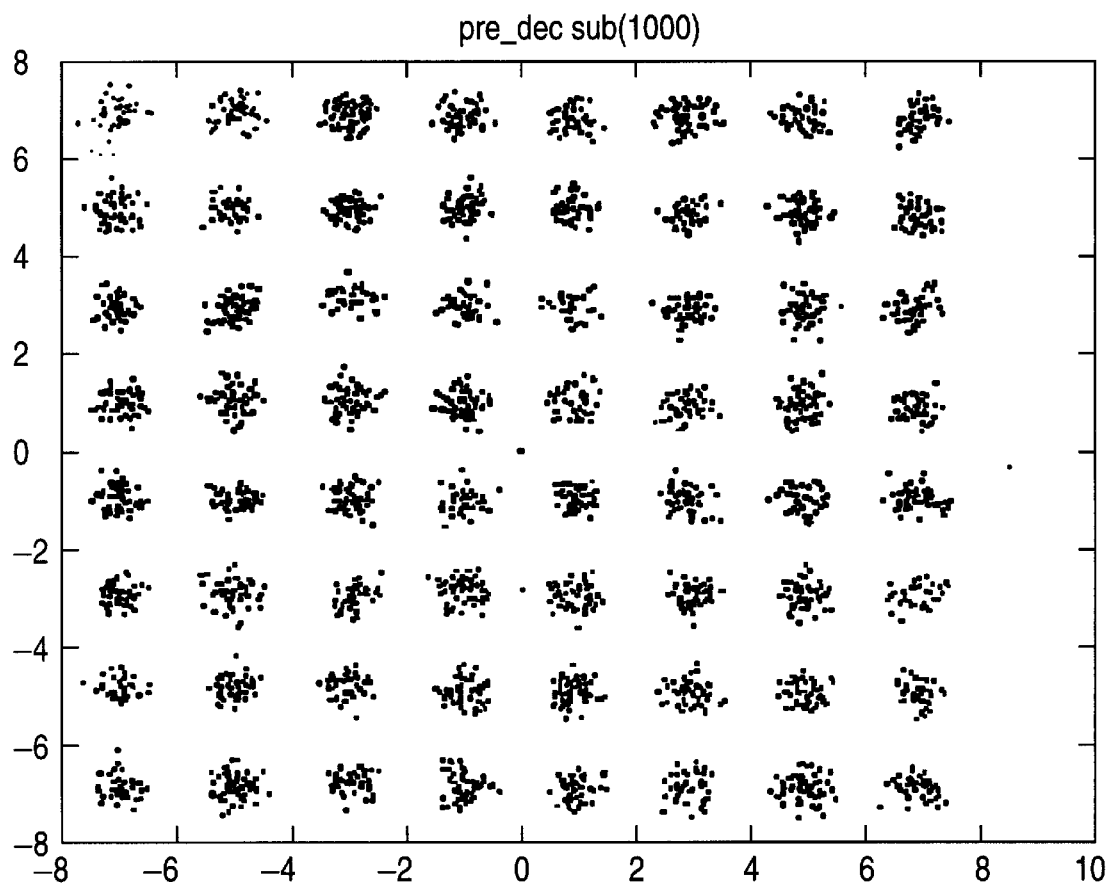
FIG. 11 is a scatter plot showing the output of the equalizer for a total of N iterations of the standard LMS equation.

FIG. 10 is a scatter plot of the output of the equalizer for a total of N iterations of the predictive update equation of the present invention. FIG. 11 is a scatter plot of the output of the equalizer for a total of N iterations of the standard LMS equation. The data in both FIG. 10 and FIG. 11 resulted from applying 64 QAM modulation to the transmitted signals.

Comparison of the two figures indicates that the scatter in the equalizer output for the standard LMS method is greater, suggesting that the coefficient values to which the standard method converge are a poorer estimate of the characteristics of the channel. Thus, the method of the present invention produces coefficients having a lower amount of noise and better equalization than those resulting from the standard LMS method. This assists the decision device to more correctly determine the transmitted signals.

Figure 12:
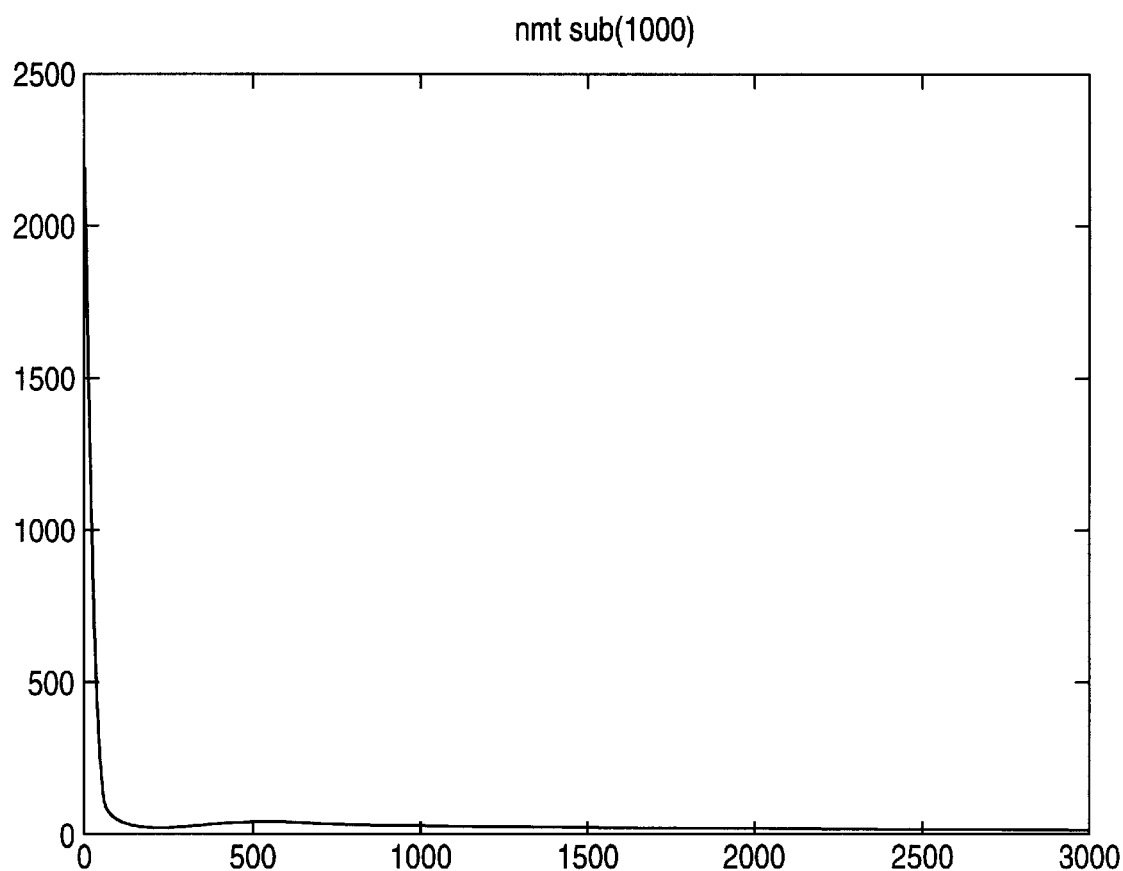
FIG. 12 is a graph showing the averaged power of the error signal used as part of the coefficient update process for the predictive update equation of the present invention.
Figure 13:
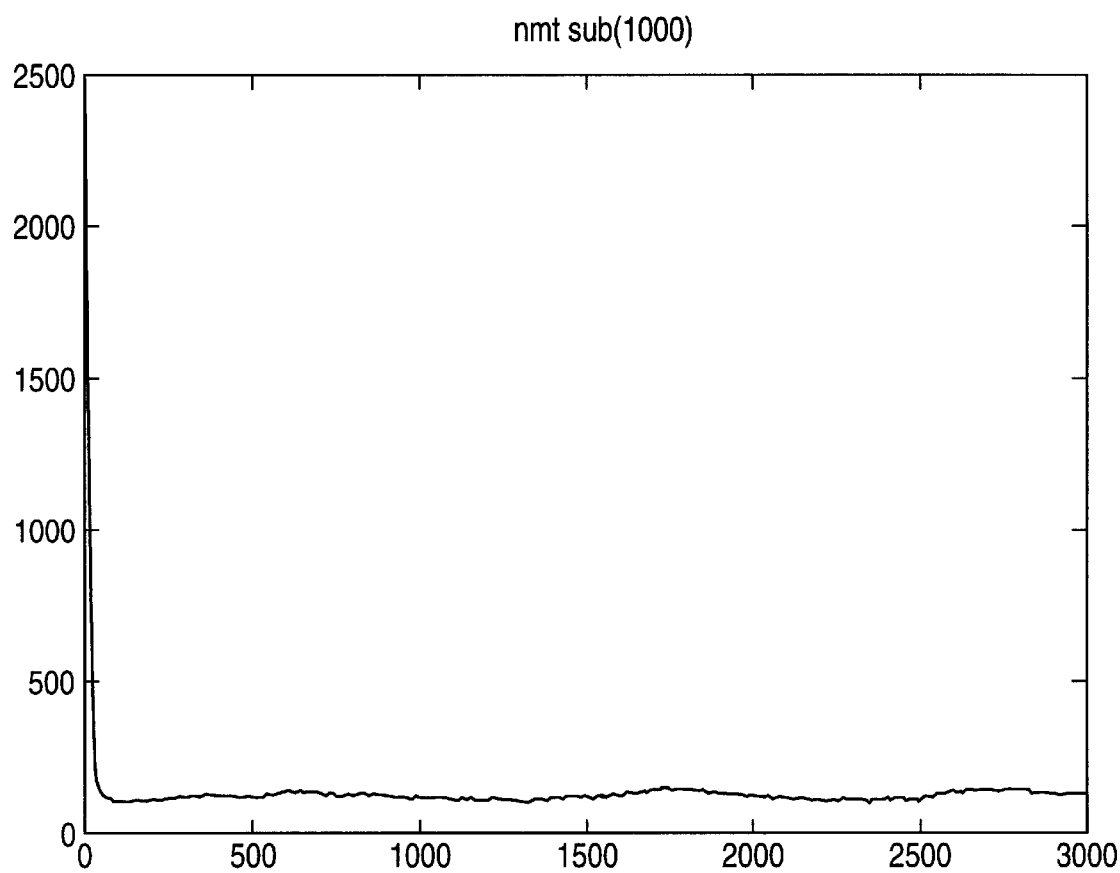
FIG. 13 is a graph showing the averaged power of the error signal used as part of the coefficient update process for the standard LMS update equation.

FIG. 12 is a graph showing the averaged power of the error signal used as part of the coefficient update process for the predictive update equation of the present invention. FIG. 13 is a graph showing the averaged power of the error signal used as part of the coefficient update process for the standard LMS update equation. Comparison of the two figures indicates that the method of the present invention produces less fluctuation in the coefficient values (less noise) and hence better tracking behavior than the standard LMS equation.

The present invention provides a method for updating the coefficients of an adaptive equalizer which exhibits better tracking behavior than a standard LMS algorithm, but has the same order of computational complexity as methods based on such algorithms. This permits the method to realize improved performance over LMS methods, but without the additional computational complexity or undesirable numerical properties of RLS methods.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. A method of iteratively updating the coefficients of an adaptive filter to compensate a received signal for the effects of a time dispersive channel, the method comprising:

storing a first set of adaptive filter coefficients in a storage element;

representing a coefficient update equation for the adaptive filter by the form $$W_i(t+1) = P_i(t)^*W_i(t) + \mu_1 \epsilon X_i^*,$$

where $W_i(t+1)$ is an updated value of an adaptive filter coefficient, $W_i(t)$ is a current value of the adaptive filter coefficient, $P_i(t)$ is a term having a magnitude substantially equal to one which causes $W_i(t+1)$ to cycle through a set of values, $\mu_1$ is a first adaptation constant, $\epsilon$ is an error term, and $X_i^*$ is the complex conjugate of the ith element of a signal input to the equalizer;

generating a second set of updated adaptive filter coefficients by applying the coefficient update equation, where the first set of coefficients corresponds to the $W_i(t)$ terms of the update equation and the second set of coefficients corresponds to the $W_i(t+1)$ terms of the update equation; and storing the second set of adaptive filter coefficients in the storage element.

2. The method of claim 1, further comprising the step of:
   representing the term $P_i(t)$ by the expression (Real $P_i(t)$ +j*Pim$_i$(t)), where Real $P_i(t)$ is the real part of $P_i(t)$ and Pim$_i$(t) is the imaginary part of $P_i(t)$.

3. The method of claim 1, further comprising the steps of:
   representing the term $P_i(t)$ by the expression $P_i(t) = (1 + j^*Pim_i(t))$;

representing an update equation for Pim$_i$(t) by the form $$Pim_i(t+1) = Pim_i(t) - \text{imaginary } (\mu_2^*\mu_1^*\epsilon^*X_i^{**}W_i^* (t))$$

where Pim$_i$(t+1) is the imaginary part of $P_i(t+1)$ and $\mu_2$ is a second adaptation constant; and using the update equation for Pim$_i$(t) to generate the second set of adaptive filter coefficients.

4. A processing system for iteratively updating the coefficients of an adaptive filter to compensate for the effects of a time dispersive channel, the system comprising:

storage means for storing a first set of coefficients of an adaptive filter;

a processor for determining a second set of coefficients for the adaptive filter, wherein the second set of coefficients is dependent upon the first set of coefficients and is related to the first set by a coefficient update equation which includes a term representing a change in a value of each coefficient in the first set of coefficients, the update equation including a term having a magnitude substantially equal to one which causes the adaptive filter coefficients to cycle through a set of values; and a controller for storing the second set of adaptive filter coefficients in the storage means.

5. The processing system of claim 4, wherein the coefficient update equation for the adaptive filter is represented by the form:

$$W_i(t+1) = P_i(t) * W_i(t) + \mu_1 \epsilon X_i^*,$$

where $W_i(t+1)$ is an updated value of an adaptive filter coefficient, $W_i(t)$ is a current value of the adaptive filter coefficient, $P_i(t)$ is the term having a repetitive behavior, $\mu_1$ is a first adaptation constant, $\epsilon$ is an error term, and $X_i^*$ is the complex conjugate of the ith element of a signal input to the equalizer, the term $P_i(t)$ is represented by the expression $P_i(t) = (1 + j * Pim_i(t))$, and an update equation for $Pim_i(t)$ is represented by the form $$Pim_i(t+1) = Pim_i(t) - \text{imaginary}\ (\mu_2 * \mu hd\ 1 * \epsilon * X_i^* * W_i^*\ (t)),$$

where $Pim_i(t+1)$ is the imaginary part of $P_i(t+1)$ and $\mu_2$ is a second adaptation constant.

* * * * *

UNITED STATES PATENT AND TRADEMARK OFFICE
CERTIFICATE OF CORRECTION

PATENT NO.: 5,805,480
DATED: September 8, 1998
INVENTOR(S): Craig B. Greenberg

It is certified that one error appears in the above-identified patent and that said Letters Patent is hereby corrected as shown below:

In Col. 14, line 14, delete "$Pim_i(t+1) = Pim_i(t) - \text{imaginary} (\mu_2 * \mu hd1 * \epsilon * X_i^* * W_i^*(t))$" and replace with --$Pim_i(t+1) = Pim_i(t) - \text{imaginary} (\mu_2 * \mu_1 * \epsilon * X_i^* * W_i^*(t))$--.

Signed and Sealed this

First Day of December, 1998

Attest:

BRUCE LEHMAN

*Attesting Officer*     *Commissioner of Patents and Trademarks*